J. SAWYER.
Hand Potato-Planters.

No. 158,742. Patented Jan. 12, 1875.

WITNESSES:

INVENTOR:
J. Sawyer
BY
ATTORNEYS.

UNITED STATES PATENT OFFICE.

JOSIAH SAWYER, OF TREMONT, ILLINOIS.

IMPROVEMENT IN HAND POTATO-PLANTERS.

Specification forming part of Letters Patent No. 158,742, dated January 12, 1875; application filed May 23, 1874.

*To all whom it may concern:*

Figure 1:
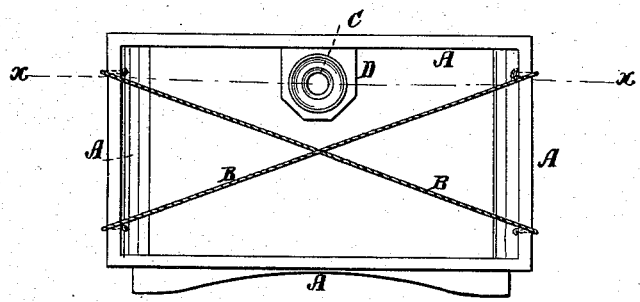
Figure 2:
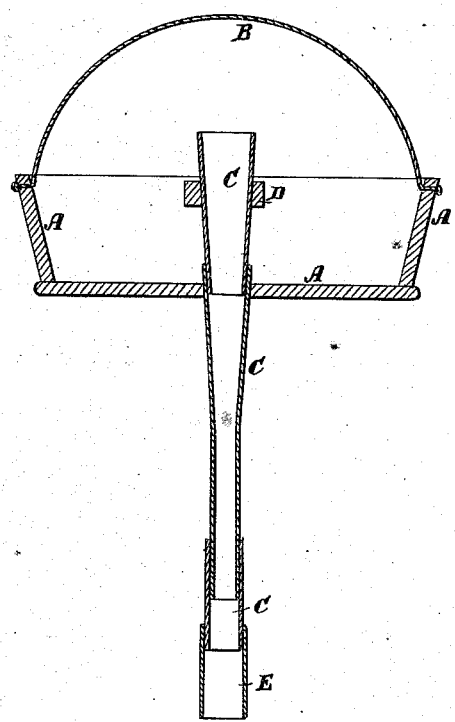

Be it known that I, JOSIAH SAWYER, of Tremont, in the county of Tazewell and State of Illinois, have invented a new and useful Improvement in Hand Potato - Dropper, of which the following is a specification:

Figure 1 is a top view of my improved device. Fig. 2 is a detail vertical section of the same, taken through the line $x\,x$, Fig. 1.

Similar letters of reference indicate corresponding parts.

The invention will first be fully described, and then pointed out in the claim.

A represents a box made of wood or other suitable light material, and with slightly-flaring sides. A convenient size for the box A is about twenty inches long, nine inches wide, and ten inches deep. The bottom of the box A projects upon the rear side, and the projecting edge is concaved, to cause the box to more readily keep its place upon the body of the person carrying it. To the ends of the box A are attached straps B, to be passed over the shoulders of the person carrying it, and which should be so formed or attached as to be adjustable in length, to enable them to be adjusted according to the height of the person carrying the box, to bring it into such a position as to be conveniently used. In the forward middle part of the bottom of the box A is formed a hole, in which is inserted a tube, C, the upper end of which rises about two inches above the edge of the box, passes through a guide, D, attached to the forward side of the said box, and is made slightly flaring, so that the potatoes may be conveniently placed in it. The tube C should be of such a length that its lower end may be within about two inches of the ground when the box A is carried in position for use. The tube C should be made in sections or lengths sliding into each other, so that its length may be readily adjusted according to the height of the person carrying the dropper. To the lower end of the tube C is attached a flexible tube, E, of rubber or other suitable material, and of such a length as to touch the ground when the box is carried in position for use, so that the potatoes will not roll when they reach the ground, but will lie exactly where dropped. In using the dropper the potatoes are cut into pieces of the desired size and placed in the box A. The person using it measures off the ground by his steps, and at the proper time he raises enough seed for a hill from the box A, and drops it into the tube C. When the dropper is set down the tube C rises through the hole in the box A, and again slips down into place when the box is raised from the ground; or the lower section of the tube C may be detached, when the box is to be set down.

Having thus described my invention, what I claim as new, and desire to secure by Letters Patent, is—

A hand potato-planter having the holder A, provided with tube C C, made in two sections, and jointed at the bottom of said holder, as and for the purpose described.

JOSIAH SAWYER.

Witnesses:
WM. DON MAUS,
WM. P. HALL.